(12) United States Patent
Zhan et al.

(10) Patent No.: US 9,819,883 B2
(45) Date of Patent: Nov. 14, 2017

(54) GLOBAL SHUTTER CORRECTION

(71) Applicant: OMNIVISION TECHNOLOGIES, INC., Santa Clara, CA (US)

(72) Inventors: Zhiyong Zhan, Milpitas, CA (US); Qingfei Chen, Santa Clara, CA (US); Chin-Chang Pai, Mountain View, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 75 days.

(21) Appl. No.: 14/958,080

(22) Filed: Dec. 3, 2015

(65) Prior Publication Data

US 2017/0163912 A1  Jun. 8, 2017

(51) Int. Cl.
*H04N 5/357* (2011.01)
*H04N 5/3745* (2011.01)

(52) U.S. Cl.
CPC .......... *H04N 5/357* (2013.01); *H04N 5/3745* (2013.01)

(58) Field of Classification Search
CPC .............................. H04N 5/357; H04N 5/369
See application file for complete search history.

(56) References Cited

U.S. PATENT DOCUMENTS

| 8,174,601 | B2 | 5/2012 | Compton et al. |
| 2009/0160989 | A1* | 6/2009 | Lauxtermann ....... H04N 5/3559 348/308 |
| 2014/0014818 | A1 | 1/2014 | Cho et al. |

* cited by examiner

Primary Examiner — Christopher K Peterson
(74) Attorney, Agent, or Firm — Christensen O'Connor Johnson Kindness PLLC

(57) ABSTRACT

A pixel circuit includes a photodiode disposed in a semiconductor material to accumulate image charge in response to incident light directed into the photodiode, and a transfer transistor coupled to the photodiode. The circuit also includes a noise correction circuit coupled to receive a transfer control signal and the noise correction circuit is coupled to selectively enable or disable the transfer transistor from receiving the transfer control signal. A storage transistor is coupled to the transfer transistor, and the transfer transistor is coupled to selectively transfer the image charge accumulated in the photodiode to the storage transistor for storage in response to the transfer control signal if the transfer transistor is enabled to receive the transfer control signal.

20 Claims, 4 Drawing Sheets

GLOBAL SHUTTER CORRECTION

TECHNICAL FIELD

This disclosure relates generally to image sensor operation and in particular but not exclusively, relates to global shutters.

BACKGROUND INFORMATION

The process of shuttering consists of exposing an image sensor to light at a rate equal to (or faster than) a frame rate. The goal of this process is to reduce blurring effects from motion within an image frame.

There are several different types of shuttering including rolling shuttering and global shuttering. A rolling shutter exists where a line of pixels, or a group of several lines of pixels, is read out while other lines in the image sensor are exposed to image light. Readout times for rolling shutter image sensors vary depending on frame rate and architecture, but can be as high as several hundred microseconds. Accordingly, due to the delay between reading each line of pixels, moving image subjects can cause optical distortion and blur within the image.

A global shutter, unlike a rolling shutter, exposes all photodiodes in the image sensor at the same time. This results in little or no image blur because there is no delay between integration of individual pixel lines during image acquisition. However, global shutters generally require an additional pixel storage element which allows the pixels to store previously acquired image charge to be read out while the next image frame is captured. This additional storage element generally enlarges the footprint of individual pixels on a wafer, and can be a source of problems such as light absorption, cross talk, etc.

BRIEF DESCRIPTION OF THE DRAWINGS

Non-limiting and non-exhaustive examples of the invention are described with reference to the following figures, wherein like reference numerals refer to like parts throughout the various views unless otherwise specified.

Figure 1:
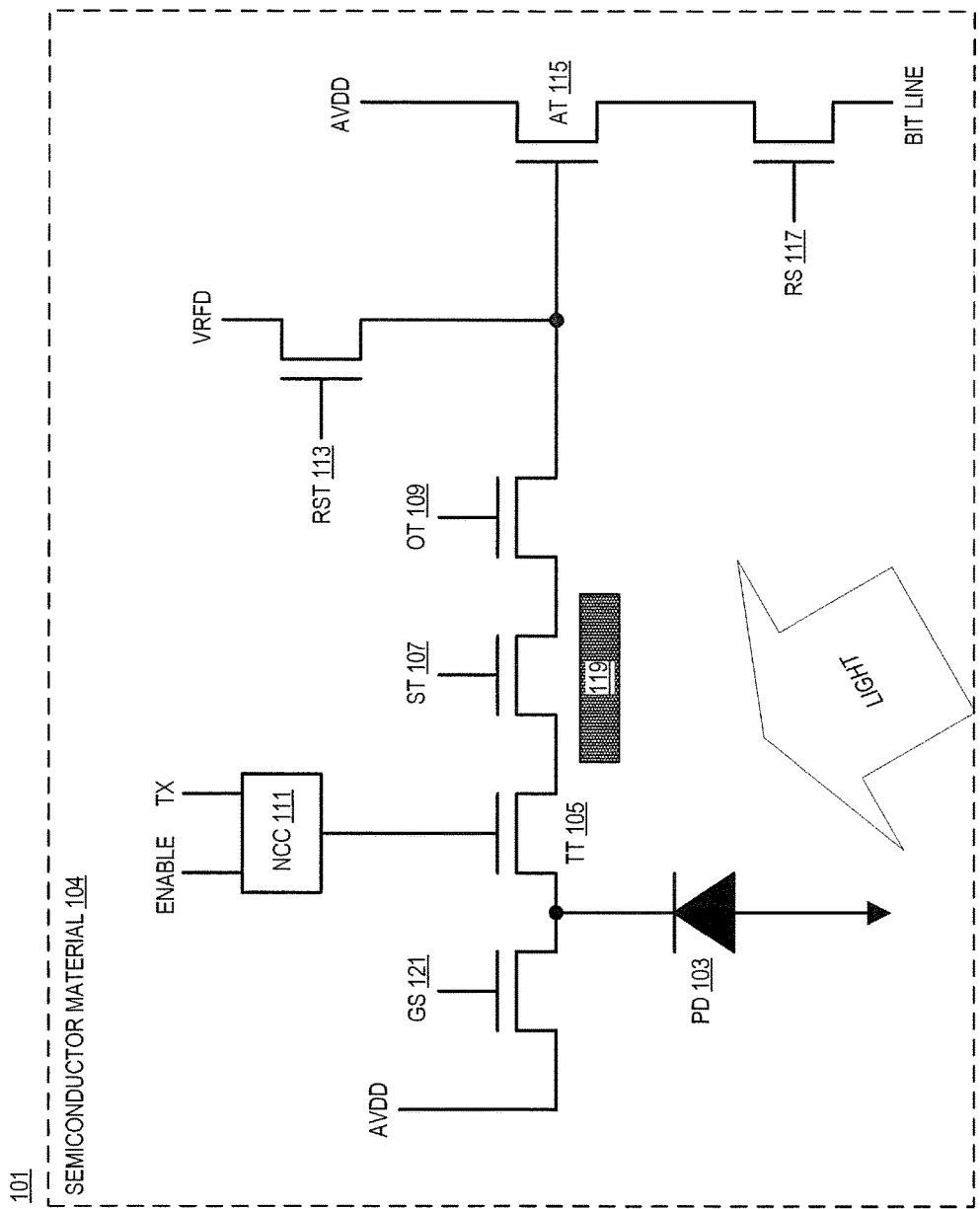
FIG. 1 is an illustration of a pixel circuit, in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of an apparatus and method for global shutter correction are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise. It is worth noting that specific elements of circuitry may be substituted for logically equivalent or analogous circuitry.

FIG. 1 is an illustration of pixel circuit 101. In the depicted example, pixel circuit 101 includes: photodiode 103, transfer transistor 105, noise correction circuit 111, storage transistor 107, output transistor 109, global shutter transistor 121, amplifier transistor 115, reset transistor 113, and row select transistor 117. Photodiode 103 is disposed in semiconductor material 104 to accumulate image charge in response to incident light directed into photodiode 103. Transfer transistor 105 is coupled to photodiode 103, and noise correction circuit 111 is coupled to the control terminal of transfer transistor 105. Global shutter transistor 121 is also coupled to photodiode 103. Transfer transistor 105 is coupled to storage transistor 107, and storage transistor 107 is coupled to output transistor 109. The control terminal of amplifier transistor 115 is coupled to an output of output transistor 109, and reset transistor 113 is also coupled to the output of output transistor 109 as well as the control terminal of amplifier transistor 115. In one example, amplifier transistor 115 includes a source follower coupled transistor. Row select transistor 117 is coupled between an output of amplifier transistor 115 and a bit line output of pixel circuit 101. In one example, a floating diffusion may be disposed between the second terminal of output transistor 109 and the control terminal of amplifier transistor 115. In another or the same example, the floating diffusion is disposed in semiconductor material 104.

In the depicted example, optical shield 119 is disposed proximate to storage transistor 107 in order to shield storage transistor 107 from incident light. In one example, optical shield 119 includes a metal, such as copper or aluminum. However in another example, optical shield 119 may include a metal oxide or semiconductor oxide. Optical shield 119 prevents formation of unwanted image charge in storage transistor 107 since, in one example, the active region of storage transistor 107 may be disposed in semiconductor material 104.

Although not depicted in FIG. 1, in one or more examples, other pieces of device architecture may be present in/on pixel circuit 101. For example, transistors (in addition to storage transistor 107) in pixel circuit 101 may be disposed proximate to an optical shield to protect them from incident light. Further, other layers of device architecture may be formed on semiconductor material 104 such as encapsulation layers, color filters, and microlenses. In one example, a color filter layer and a microlens layer are disposed proximate to semiconductor material 104 such that they are optically aligned with photodiode 103. In one example, the color filter layer includes red, green, and blue color filters which may be arranged into a Bayer pattern, EXR pattern, X-trans pattern, or the like. However, in a different or the same example, the color filter layer may include infrared filters, ultraviolet filters, or other light filters that isolate invisible portions of the EM spectrum. In the same or a different example, a microlens layer is formed on the color filter layer. The microlens layer may be fabricated from a photo-active polymer that is patterned on the surface of the color filter layer. Once rectangular blocks of polymer are patterned on the surface of the color filter layer, the blocks may be melted (or reflowed) to form the dome-like structure characteristic of microlenses. Additionally, in one example, pixel circuit 101 may be entirely disposed, in/on semiconductor material 104 and the internal components of pixel circuit 100 may be surrounded by electrical and/or optical isolation structures. This may help to reduce noise in pixel circuit 101. Electrical isolation may be accomplished by etching isolation trenches in semiconductor material 104 which may then be filled with semiconductor material, oxide material, or the like. Alternatively, optical isolation structures may be formed by constructing a reflective grid on the surface of semiconductor material 104 disposed beneath the color filter layer.

In operation, noise correction circuit 111 is coupled to receive a transfer control signal (TX), and is also coupled to selectively enable or disable transfer transistor 105 from receiving the transfer control signal. In one example, noise correction circuit 111 may be implemented as an AND gate, with one input coupled to receive the transfer signal and the other input coupled to receive an enable signal. The AND gate may take the form of a NAND gate coupled to an inverter. Transfer transistor 105 is coupled to selectively transfer image charge accumulated in photodiode 103 to storage transistor 107 for storage in response to the transfer control signal, if transfer transistor 105 is enabled (in response to the enable signal) to receive the transfer control signal. Output transistor 109 may be coupled to selectively output an image charge signal responsive to the image charge stored in storage transistor 107 provided transfer transistor 105 is enabled to receive the transfer control signal from noise correction circuit 111. Output transistor 109 may also be coupled to selectively output a parasitic signal (noise) responsive to a photoelectric charge (noise) accumulated in storage transistor 107 provided transfer transistor 105 is disabled (in response to the enable signal) from receiving the transfer control signal from noise correction circuit 111. In other words, output transistor 109 will output a noise signal when transfer transistor 105 is disabled from receiving the transfer control signal. It should be noted that the noise charge stored in storage transistor 107 is representative of light induced noise charge accumulated within storage transistor 107. Despite the presence of optical shields, ambient light may leak into storage transistor 107. Since pixel circuit 101 selectively outputs both an image charge signal and a noise signal, the noise signal can be removed from the final image in real time. Accordingly, final image quality and shutter efficiency can be enhanced.

Figure 2A:
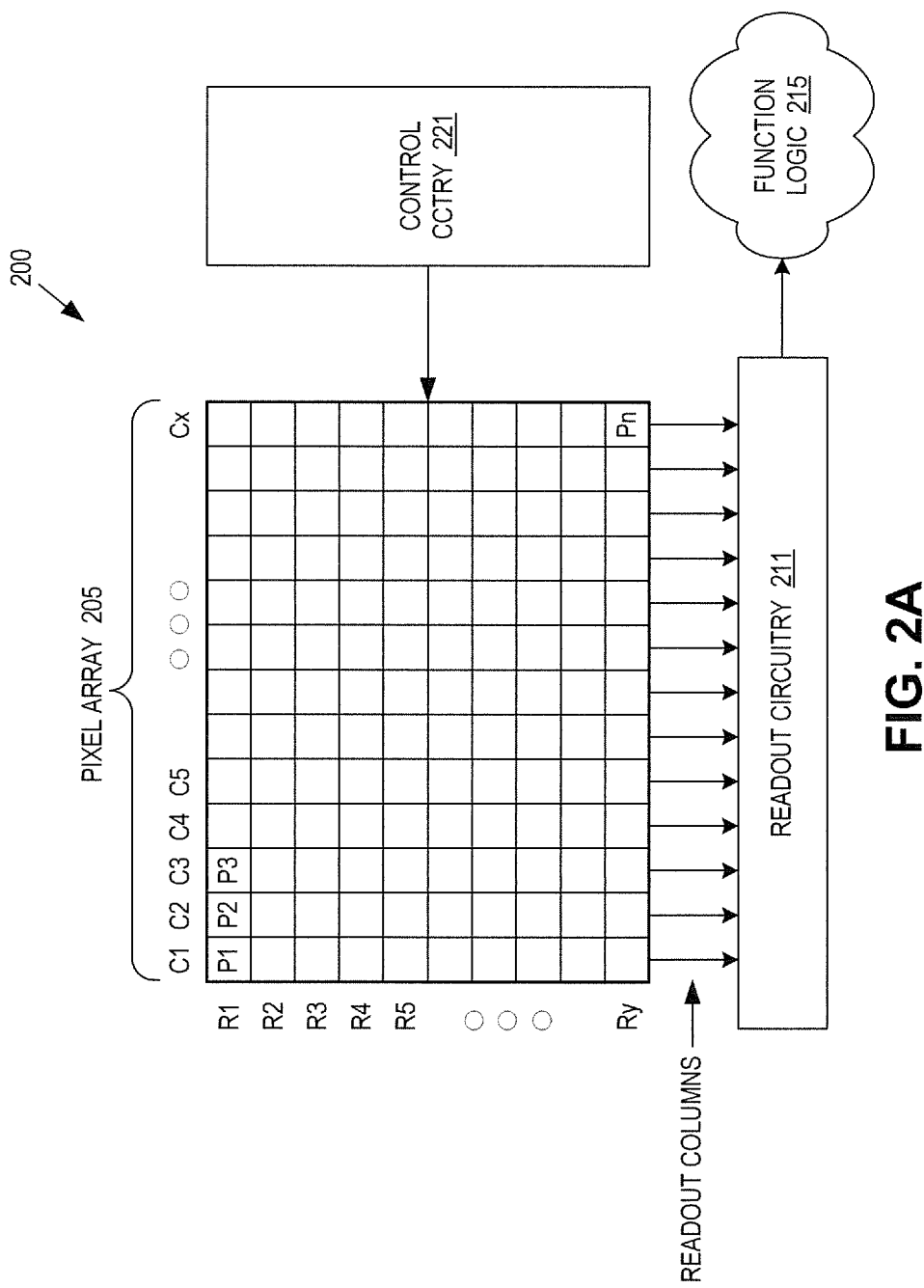
FIG. 2A is a block diagram illustrating one example of an imaging system including the pixel circuit of FIG. 1, in accordance with the teachings of the present invention.

FIG. 2A is a block diagram illustrating one example of an imaging system including the pixel circuit (e.g., pixel circuit 101) of FIG. 1. Imaging system 200 includes pixel array 205, control circuitry 221, readout circuitry 211, and function logic 215. In one example, pixel array 205 is a two-dimensional (2D) array of photodiodes, or image sensor pixels (e.g., pixels P1, P2 . . . , Pn). As illustrated, photodiodes are arranged into rows (e.g., rows R1 to Ry) and columns (e.g., column C1 to Cx) to acquire image data of a person, place, object, etc., which can then be used to render a 2D image of the person, place, object, etc.

In one example, after each image sensor photodiode/pixel in pixel array 205 has acquired its image data or image charge, the image data is readout by readout circuitry 211 and then transferred to function logic 215. Readout circuitry 211 may be coupled to readout image data from the plurality of photodiodes in pixel array 205. In various examples, readout circuitry 211 may include amplification circuitry, analog-to-digital (ADC) conversion circuitry, or otherwise. Function logic 215 may simply store the image data or even manipulate the image data by applying post image effects (e.g., crop, rotate, remove red eye, adjust brightness, adjust contrast, or otherwise). In the depicted example, function logic 215 is coupled to the readout circuitry 211, and function logic 215 is coupled to cancel noise from the image acquired from pixel array 205 in response to the noise signals readout from pixel array 205. In one example, readout circuitry 211 may readout a row of image data at a time along readout column lines (illustrated) or may readout the image data using a variety of other techniques (not illustrated), such as a serial readout or a full parallel readout of all pixels simultaneously.

In one example, control circuitry 221 is coupled to pixel array 205 to control operation of the plurality of photodiodes in pixel array 205. For example, control circuitry 221 may generate a shutter signal for controlling image acquisition. In the depicted example, the shutter signal is a global shutter signal for simultaneously enabling all pixels within pixel array 205 to simultaneously capture their respective image data during a single acquisition window. In another example, image acquisition is synchronized with lighting effects such as a flash. In the depicted example, control circuitry 221 is coupled to set noise correction circuits included in a first portion of the plurality of pixel circuits (i.e., circuits associated with pixels P1, P2 . . . , Pn) to output image data of an image, and control circuitry 221 is coupled to set noise correction circuits included in a second portion of the plurality of pixel circuits (i.e., circuits associated with pixels P1, P2 . . . , Pn) to output noise data concurrently with the first portion of the plurality of pixel circuits outputting image data of the image.

In one example, imaging system 200 may be included in a digital camera, cell phone, laptop computer, or the like. Additionally, imaging system 200 may be coupled to other pieces of hardware such as a processor, memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 200, extract image data from imaging system 200, manipulate image data supplied by imaging system 200, or reset image data in imaging system 200.

Figure 2B:
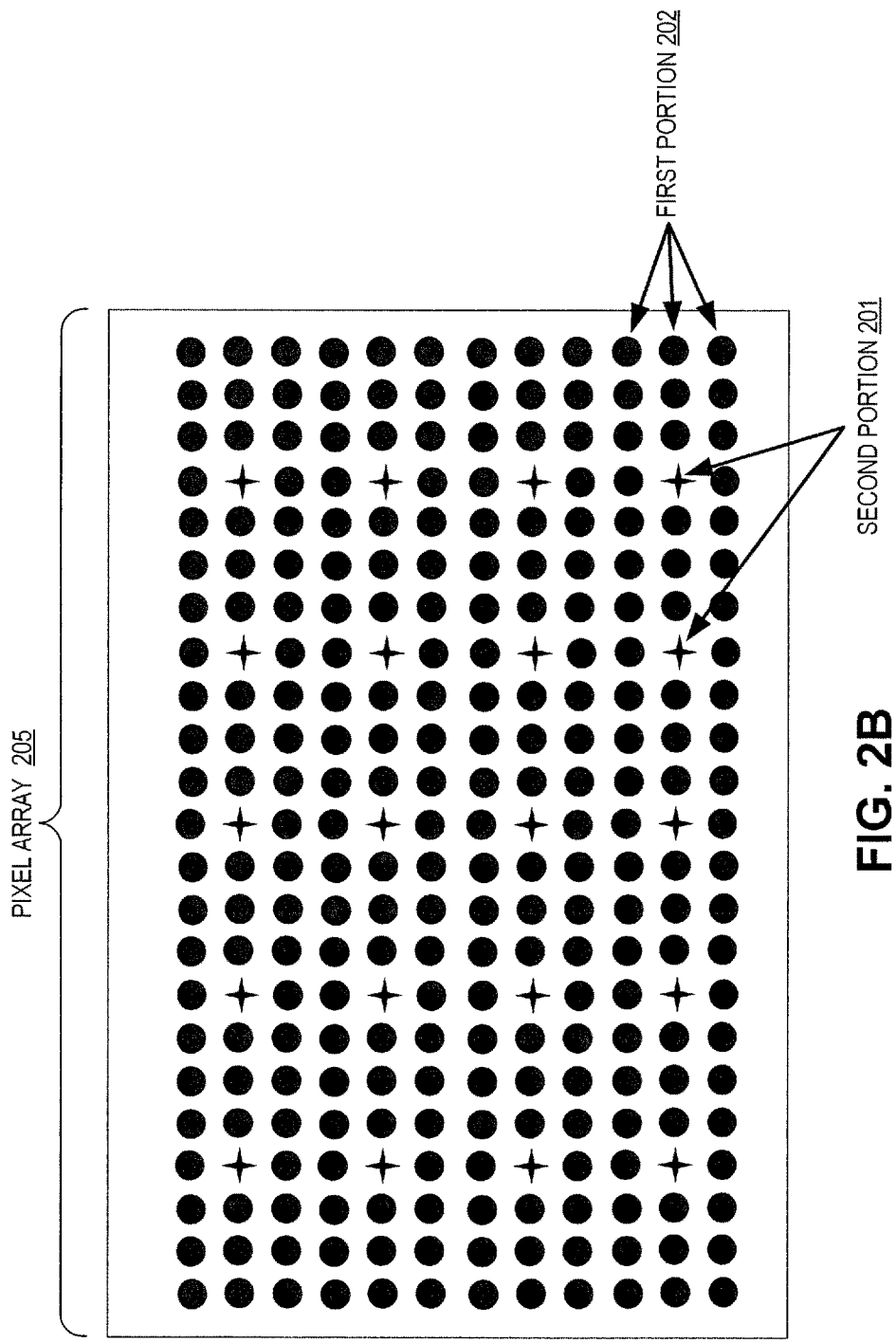
FIG. 2B is an example illustration of the pixel array in FIG. 2A, in accordance with the teachings of the present invention.

FIG. 2B is an example illustration of the pixel array 205 in FIG. 2A. In the depicted example, the pixel circuit of FIG. 1 (e.g., pixel circuit 101) is one of a plurality of pixel circuits arranged in pixel array 205 and disposed in a semiconductor material (e.g., semiconductor material 104). Noise correction circuits are included in a first portion of the plurality of pixel circuits 202 (shown as circles) and are set to output image data of the image. Noise correction circuits included in a second portion of the plurality of pixel circuits 201

(shown as stars) are set to output noise data concurrently with the first portion of the plurality of pixel circuits 202 outputting image data of the image. In the depicted example, second portion of the plurality of pixel circuits 201 are interspersed among the first portion 202 of the plurality of pixel circuits in the pixel array. In one example, the first 202 and second 201 portions of the plurality of pixel circuits are coupled to be dynamically selected within the pixel array for each image acquisition of pixel array 205. In other words, the pixels that output image data of the image and the pixels that output noise data may change. In one example, the location of pixels that output image data and the location of pixels that output noise data may change as a function of time, in response to light/image conditions, in response to user input (e.g., in a photography, cell phone, or automotive application), or randomly. However, in another example, the pixels that output image data of the image and the pixels that output noise data may be static (i.e., remain the same for every exposure period).

Figure 3:
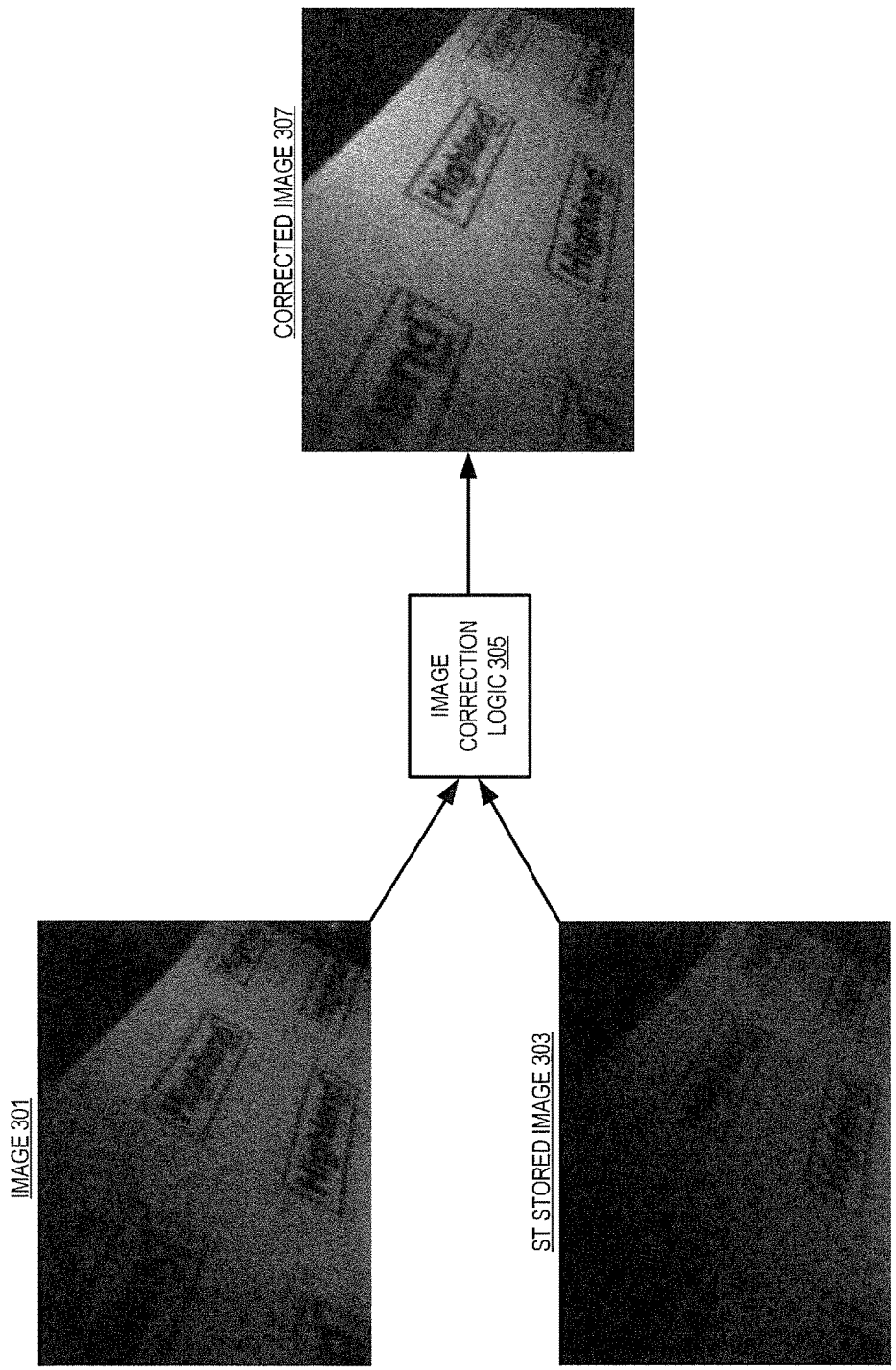
FIG. 3 shows an example image correction process using the pixel circuit of FIG. 1, in accordance with the teachings of the present invention.

FIG. 3 shows an example image correction process using the pixel circuit of FIG. 1. In the depicted example, image 301 is collected by photodiodes in a pixel array (e.g., pixel array 205) via a global shuttering process. Thus all photodiodes in the pixel array are capturing light (to generate image charge) at the same time. During the image acquisition process, storage transistors (e.g., storage transistor 107) may collect unwanted ambient light/noise charge that—when read out of storage transistors at the same time as the image charge collected in the photodiodes—degrades the quality of the final image. Accordingly, in the depicted example, some of the pixels in the pixel array will read out image charge from their respective photodiodes (along with the noise charge generated in their respective storage transistors) to form image 301, while other pixels will only read out the noise charge generated in their respective storage transistors to form storage transistor stored image 303. Both image 301 and storage transistor stored image 303 are sent to image correction logic 305. Image correction logic 305 may correct image 301 by subtracting the noise charge signal (i.e., storage transistor stored image 303) from image 301. Thus, image correction logic 305 produces corrected image 307, and may output corrected image 307 to a display, memory, etc.

In one example, the pixels that only read out noise charge from their storage transistors achieve this feat by having a noise correction circuit coupled to the control terminal of their transfer transistors. In these pixels, the transfer transistor is disposed between the photodiode and the storage transistor. When the noise correction circuit disables the transfer transistor, charge from the photodiode is unable to be transferred to the storage transistor. As a result, image 301 is formed from the pixels that read out image data from their photodiodes, and storage transistor stored image 303 is formed from pixels that read out data from their storage transistors. In one example, the pixels in the array that form image 301 and the pixels in the array that form storage transistor stored image 303 may change between subsequent image acquisition windows. Depending on use case, a user of the imaging system (in a camera, phone, automobile, etc.) may choose how many pixels read out charge from their photodiodes and how many pixels read out charge solely from their storage transistors. This may allow the user to alter image quality based on personal preference. Additionally, the image sensor may select the number and spatial configuration of pixels that read out image charge from their photodiodes vs. those that only read out charge from their storage transistors. This number may change depending on lighting conditions, image subject location, calibration measurements, etc.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A pixel circuit, comprising:
   a photodiode disposed in a semiconductor material to accumulate image charge in response to incident light directed into the photodiode;
   a transfer transistor coupled to the photodiode;
   a noise correction circuit coupled to receive a transfer control signal, wherein the noise correction circuit is coupled to selectively enable or disable the transfer transistor from receiving the transfer control signal;
   a storage transistor coupled to the transfer transistor, wherein the transfer transistor is coupled to selectively transfer the image charge accumulated in the photodiode to the storage transistor for storage in response to the transfer control signal if the transfer transistor is enabled to receive the transfer control signal; and
   an output transistor coupled to the storage transistor, wherein the output transistor is coupled to selectively output an image charge signal responsive to the image charge stored in the storage transistor if the transfer transistor is enabled to receive the transfer control signal, and wherein the output transistor is coupled to selectively output a noise signal responsive to noise charge stored in the storage transistor if the transfer transistor is disabled from receiving the transfer control signal;
   wherein the pixel circuit is one of a plurality of pixel circuits arranged in a pixel array and disposed in the semiconductor material to acquire an image, wherein the noise correction circuits included in a first portion of the plurality of pixel circuits are set to facilitate read out of the image charge signal, and wherein noise correction circuits included in a second portion of the plurality of pixel circuits are set to facilitate read out of the noise signal concurrently with the first portion of the plurality of pixel circuits reading out the image charge signal.

2. The pixel circuit of claim 1 wherein the noise charge stored in the storage transistor is representative of light induced noise charge accumulated within the storage transistor.

3. The pixel circuit of claim 1 wherein the transfer transistor is coupled to remain off when the transfer transistor is disabled from receiving the transfer control signal.

4. The pixel circuit of claim 1 further comprising a global shutter transistor coupled to the photodiode.

5. The pixel circuit of claim 1 further comprising:
   an amplifier transistor coupled to an output of the output transistor;

a reset transistor coupled to the output of the output transistor and an input of the amplifier transistor; and a row select transistor coupled between an output of the amplifier transistor and a bit line output of the pixel circuit.

6. The pixel circuit of claim 5 wherein the amplifier transistor includes a source follower coupled transistor.

7. The pixel circuit of claim 1 further comprising an optical shield disposed proximate to the storage transistor to shield the storage transistor from the incident light.

8. The pixel circuit of claim 1, wherein the second portion of the plurality of pixel circuits are interspersed among the first portion of the plurality of pixel circuits in the pixel array.

9. The pixel circuit of claim 1, wherein the first and second portions of the plurality of pixel circuits are coupled to be dynamically selected within the pixel array for each image acquisition of the pixel array.

10. The pixel circuit of claim 1, wherein the image charge signal and the noise signal are readout to bitlines.

11. An imaging system, comprising:
a pixel array including a plurality of pixel circuits arranged in a semiconductor material, wherein each one of the plurality of pixel circuits includes:
a photodiode disposed in a semiconductor material to accumulate image charge in response to incident light directed into the photodiode;
a transfer transistor coupled to the photodiode;
a noise correction circuit coupled to receive a transfer control signal, wherein the noise correction circuit is coupled to selectively enable or disable the transfer transistor from receiving the transfer control signal;
a storage transistor coupled to the transfer transistor, wherein the transfer transistor is coupled to selectively transfer the image charge accumulated in the photodiode to the storage transistor for storage in response to the transfer control signal if the transfer transistor is enabled to receive the transfer control signal; and
an output transistor coupled to the storage transistor, wherein the output transistor is coupled to selectively output an image charge signal responsive to the image charge stored in the storage transistor if the transfer transistor is enabled to receive the transfer control signal, and wherein the output transistor is coupled to selectively output a noise signal responsive to noise charge stored in the storage transistor if the transfer transistor is disabled from receiving the transfer control signal;
control circuitry coupled to the pixel array to control operation of the pixel array, wherein the control circuitry is coupled to set noise correction circuits included in a first portion of the plurality of pixel circuits to facilitate read out of the image charge signal, and wherein the control circuitry is coupled to set noise correction circuits included in a second portion of the plurality of pixel circuits to facilitate read out of the noise signal concurrently with the first portion of the plurality of pixel circuits reading out the image charge signal; and
readout circuitry coupled to the pixel array to readout the image charge and noise signals selectively output from the plurality of pixels to acquire an image.

12. The imaging system of claim 11 wherein the noise charge stored in the storage transistor is representative of light induced noise charge accumulated within the storage transistor.

13. The imaging system of claim 11 wherein the transfer transistor is coupled to remain off when the transfer transistor is disabled from receiving the transfer control signal.

14. The imaging system of claim 11 wherein each one of the plurality of pixel circuits further includes a global shutter transistor coupled to the photodiode.

15. The imaging system of claim 11 wherein each one of the plurality of pixel circuits further includes:
an amplifier transistor coupled to an output of the output transistor;
a reset transistor coupled to the output of the output transistor and an input of the amplifier transistor; and
a row select transistor coupled between an output of the amplifier transistor and a bit line output of the pixel circuit.

16. The imaging system of claim 11 wherein each one of the plurality of pixel circuits further includes an optical shield disposed proximate to the storage transistor to shield the storage transistor from the incident light.

17. The imaging system of claim 11 further comprising function logic coupled to the readout circuitry, wherein the function logic is coupled to cancel noise from the image acquired from the pixel array in response to the noise signals readout from the pixel array.

18. The imaging system of claim 11, wherein the second portion of the plurality of pixel circuits are interspersed among the first portion of the plurality of pixel circuits in the pixel array.

19. The imaging system of claim 11, wherein the control circuitry is coupled to dynamically select the first and second portions of the plurality of pixel circuits within the pixel array for each image acquisition of the pixel array.

20. The pixel circuit of claim 10, wherein a position of the first portion of the plurality of pixel circuits set to read out the image charge signal and a position of the second portion of the plurality of pixel circuits set to read out the noise signal changes as a function of at least one of time, light conditions, or user input.

* * * * *